(12) United States Patent
Reinhardt

(10) Patent No.: US 6,772,712 B2
(45) Date of Patent: Aug. 10, 2004

(54) ENERGY SYSTEM

(75) Inventor: Aldon R. Reinhardt, Livermore, CA (US)

(73) Assignee: Vapor Tech, Inc., Pleasanton, CA (US)

( * ) Notice: Subject to any disclaimer, the term of this patent is extended or adjusted under 35 U.S.C. 154(b) by 0 days.

(21) Appl. No.: 10/676,699

(22) Filed: Sep. 30, 2003

(65) Prior Publication Data

US 2004/0060522 A1 Apr. 1, 2004

Related U.S. Application Data

(62) Division of application No. 09/953,024, filed on Sep. 13, 2001, now Pat. No. 6,666,172.

(51) Int. Cl.[7] .................................................. F22B 1/00
(52) U.S. Cl. .................. 122/4 R; 122/31.1; 122/31.2; 122/367.1; 122/367.2; 237/16; 237/19; 237/74
(58) Field of Search ................................. 122/4 R, 18.1, 122/18.2, 18.3, 20 B, 31.1, 31.2, 367.1, 367.2; 237/16, 19, 69, 70, 74

(56) References Cited

U.S. PATENT DOCUMENTS

| | | |
|---|---|---|
| 4,512,288 A | 4/1985 | Michaud |
| 4,633,821 A | 1/1987 | Cleer, Jr. |
| 4,993,402 A | 2/1991 | Ripka |
| 5,615,668 A | 4/1997 | Panz et al. |
| 6,016,773 A | 1/2000 | Zinke |
| 6,293,277 B1 | 9/2001 | Panz et al. |
| 6,338,337 B1 | 1/2002 | Panz et al. |
| 6,666,172 B2 * | 12/2003 | Reinhardt ............ 122/4 R |

* cited by examiner

*Primary Examiner*—Jiping Lu
(74) *Attorney, Agent, or Firm*—Bever, Hoffman & Harms, LLP; E. Eric Hoffman

(57) ABSTRACT

A low-pressure energy system is provided that includes a combustion chamber immersed in water within an insulated container. Low-pressure air flow is introduced into one end of the combustion chamber. Fuel, sparks and water are also introduced to the combustion chamber, thereby generating steam and heat. The steam is blown through the combustion chamber to a first radiator, which emits heat and a steam exhaust, which can be used to increase the humidity of the enclosure housing the energy system. The heat generated by the combustion chamber heats the water in the insulated container. The heated water is pumped through a second radiator, thereby extracting additional heat from the system. A fan may be configured to introduce air flow over both the first and second radiators, thereby further improving heat transfer to the ambient air. Water can optionally be omitted from the combustion chamber.

11 Claims, 3 Drawing Sheets

ENERGY SYSTEM

RELATED APPLICATION

The present application is a divisional of U.S. patent application Ser. No. 09/953,024 filed by Aldon R. Reinhardt on Sep. 13, 2001, now U.S. Pat. No. 6,666,172.

FIELD OF THE INVENTION

The present invention relates to an energy system. More specifically, the present invention relates to an efficient energy transfer system in which steam is generated.

BACKGROUND OF THE INVENTION

Plant-growing nurseries typically use steam-generating boilers to provide the heat and humidity required to enable plants to grow and/or survive during cold weather conditions. These conventional boilers have a relatively long start-up time, on the order of 6 to 8 hours. While operating, each of these conventional boilers will burn an average of 250 to 300 cubic feet of natural gas per minute. A conventional boiler may require 80 deca-therms per month, for an average monthly natural gas cost of about $300,000. In addition, these conventional boilers require 10–20 horsepower pumps for circulating the heated water. These conventional boilers are not adjustable to precisely control the humidity of a greenhouse. Humidity control is provided by turning the boiler on and off, as needed. As described above, turning the boiler on is a time-consuming and expensive process.

Conventional boilers are also relatively expensive to maintain and replace. A typical boiler will cost on the order of $40,000 to replace. Moreover, conventional boilers operate at pressures greater than 14.7 pounds per square inch (psi), thereby requiring the boiler system to meet the requirements of the Federal Boiler Code. The efficiency of a conventional boiler system is on the order of 30 to 35 percent. Moreover, conventional boilers are noisy when operating, often reaching decibel levels which are dangerous to human ears.

It would therefore be desirable to have an improved energy (heating) system, which overcomes the above-described deficiencies of the prior art.

SUMMARY

Accordingly, the present invention provides a low-pressure energy system that includes a combustion chamber immersed in water within an insulated container. A blower is coupled to an air input port of the combustion chamber, such that low-pressure air flow is introduced into one end of the combustion chamber. A fuel supply system is coupled to a fuel input port of the combustion chamber, such that a fuel such as propane or natural gas is introduced to the combustion chamber. The maximum fuel flow rate is relatively small, on the order of 10 to 20 standard cubic feet per hour. A water supply system is coupled to a water input port of the combustion chamber, such that water is introduced to the combustion chamber. The maximum water flow rate is also relatively small, on the order of 2 gallons per hour. Finally, a spark generator, such as a spark plug, is also located in the combustion chamber. An ignition system causes the spark generator to continuously introduce sparks to the combustion chamber.

The sparks ignite the fuel/air/water mixture, thereby generating steam, which is blown through the combustion chamber to a first radiator. The first radiator extracts heat from the steam, such that the first radiator heats the ambient air within an enclosure housing the energy system. The first radiator also emits exhaust steam, which can be used to increase the humidity of the ambient air within the enclosure. Alternatively, the exhaust steam can be routed outside of the enclosure, such that the exhaust steam does not affect the ambient humidity in the enclosure. The steam pressure in the energy system is on the order of 2 psi, such that the energy system does not need to comply with the Federal Boiler Code.

The steam generation process heats the combustion chamber, and thereby the surrounding water in the insulated container. In one embodiment, the generated steam is passed through coiled tube structures that are submerged in the water, thereby improving the heat transfer to the water. The heated water is pumped from the insulated container, through a second radiator and back to the insulated container. The second radiator extracts additional heat from the system, which is used to heat the ambient air. In one embodiment, a fan is positioned to introduce air flow over both the first and second radiators, thereby further improving the heat transfer to the ambient air.

Advantageously, the energy system of the present invention has an efficiency of about 71 percent, such that fuel requirements (i.e., fuel cost) are greatly reduced with respect to conventional systems. In addition, the energy system of the present invention can be operational within minutes of being turned on. Moreover, the energy system is relatively small compared to conventional systems. The replacement cost of the energy system (or various parts of the energy system) is small compared with conventional systems. Furthermore, the energy system of the present invention is relatively quiet with respect to conventional systems.

The present invention will be more fully understood in view of the following description and drawings.

DETAILED DESCRIPTION

Figure 1:
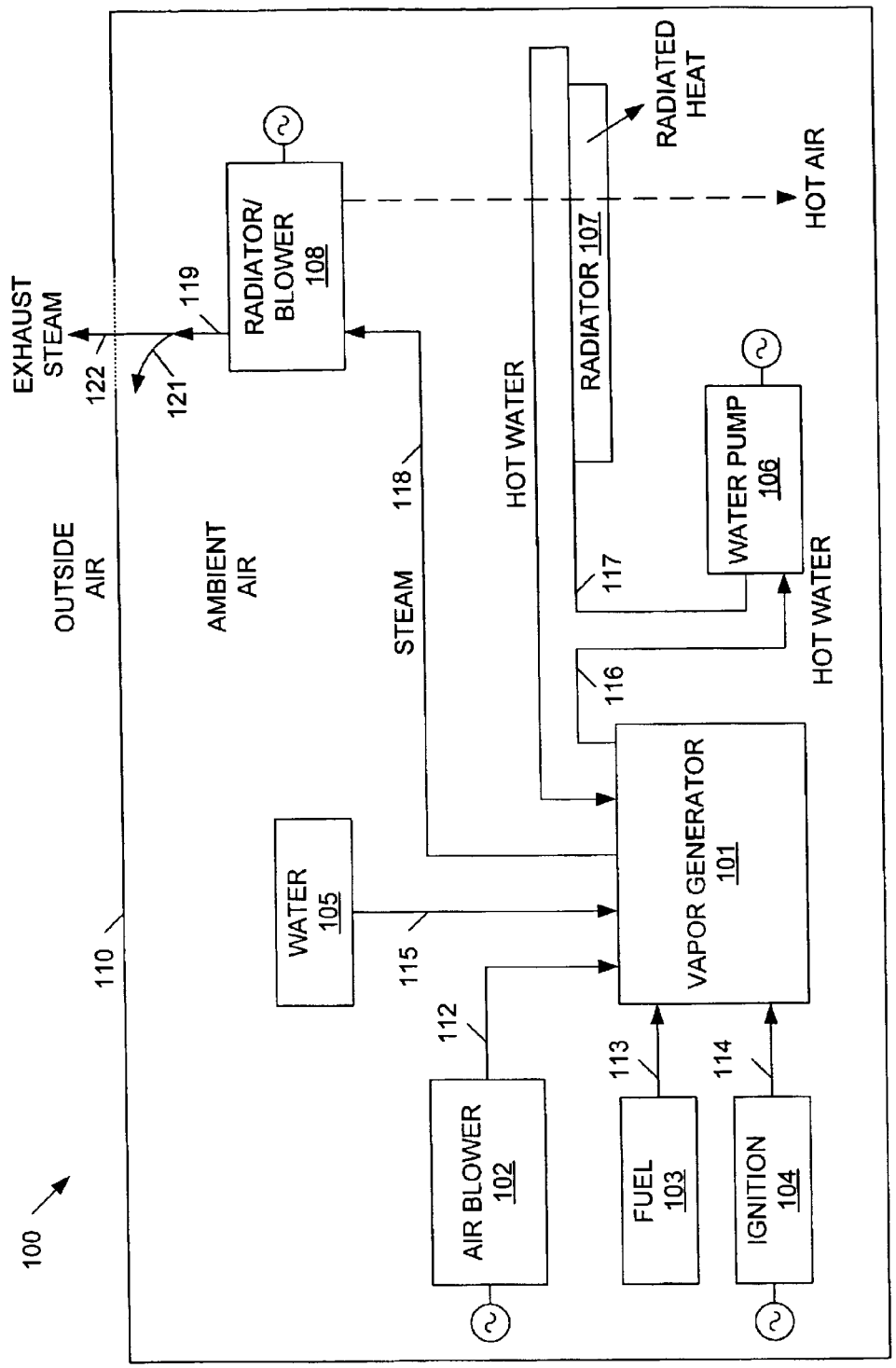
FIG. 1 is a block diagram of an energy system in accordance with one embodiment of the present invention.

FIG. 1 is a block diagram of an energy system 100 in accordance with one embodiment of the present invention. Energy system 100 includes vapor generator 101, air blower 102, fuel supply 103, ignition system 104, water supply 105, water pump 106, radiator element 107 and radiator/blower 108. Energy system 100 further includes blower duct 112, fuel line 113, ignition wires 114, water supply line 115, hot water lines 116–117, steam line 118 and exhaust port 119. Energy system is located within enclosure 110, which may be partially or totally enclosed. In one embodiment, enclosure 110 is a greenhouse.

In general, energy system 100 operates as follows to heat (and optionally humidify) the ambient air within enclosure 110. Air, water, fuel and sparks are introduced to vapor generator 101 by air blower 102, water supply 105, fuel supply 103 and ignition system 104, respectively. The sparks ignite the fuel and air to heat the water. In response, vapor generator 101 generates steam (and heat). The steam is routed to radiator/blower 108 and exhaust port 119 through steam line 118. Radiator/blower 108 extracts heat from the steam, and directs this heat into the ambient air through downward-pointing vents. Radiator/blower 108 includes a fan, which can be turned on to increase the heat transfer into the ambient air. Radiator/blower 108 is positioned above radiator element 107, such that the fan of radiator/blower 108 also provides air flow over radiator element 107.

The steam output by exhaust port 119 can be discharged into the ambient air to increase the humidity (and temperature) of the ambient air within enclosure 110 (see, exhaust path 121). Alternatively, the steam output by exhaust port 119 can be discharged outside of enclosure 110 (see, exhaust path 122).

The heat created by vapor generator 101 is also used to heat water within a separate compartment of vapor generator 101. This heated water is routed from vapor generator 101 to water pump 106 via hot water line 116. Water pump 106 pumps the hot water through hot water line 117, which returns the hot water to the separate compartment of vapor generator 101. The hot water traveling through hot water line 117 results in heat transfer to radiator element 107, such that element 107 radiates heat to the ambient air. As described above, radiator/blower 108 provides air flow over radiator element 107, thereby increasing the amount of heat transfer to the ambient air. Energy system 100 is described in more detail below.

Figure 2:
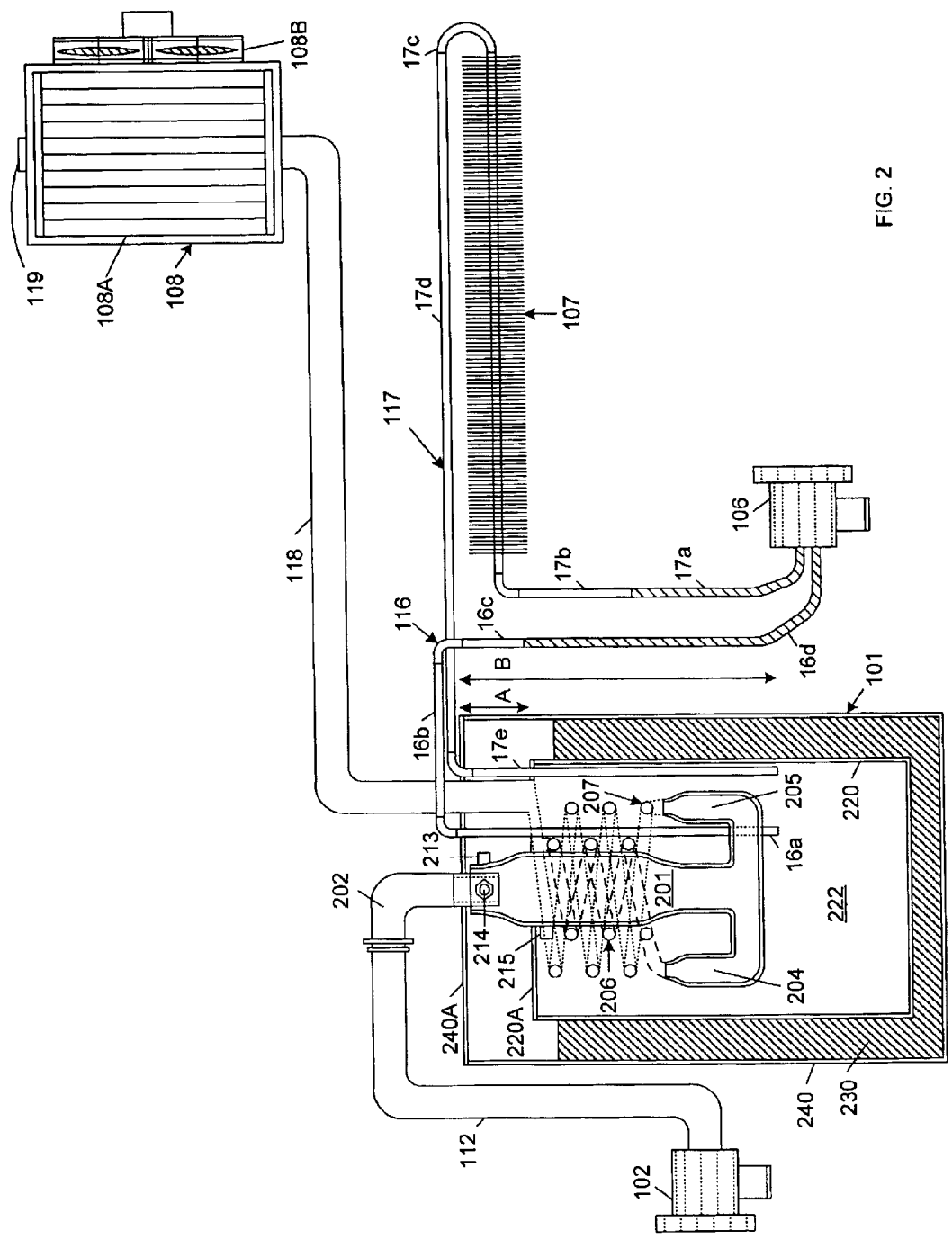
FIG. 2 is a schematic diagram of a vapor generator and other selected elements of the energy system of FIG. 1 in accordance with one embodiment of the present invention.

FIG. 2 is a schematic diagram of vapor generator 101 and other selected elements of energy system 100 in accordance with one embodiment of the present invention. Vapor generator 101 includes combustion chamber 201, coiled tube structures 206–207, inner container 220, water 222, insulating material 230 and outer container 240.

Combustion chamber 201 is a generally cylindrical element made of stainless steel, and having a wall thickness of about 0.250 inches. Combustion chamber 201 includes a first opening at the top of the chamber having an inside diameter of about 2 inches. Combustion chamber 201 then widens out to an inside diameter of about 5 inches at a centrally located area of the chamber. The centrally located area of the chamber has a height of about 8 inches. Combustion chamber 201 then narrows back down to an inside diameter of about 2 inches near the bottom of the chamber. This portion of combustion chamber 201 is hereinafter referred to as the main cylinder of the combustion chamber. This main cylinder has a center axis with extends vertically through the cylinder. In the described embodiment, the main cylinder has a height of about 20 inches along the center axis.

Combustion chamber 201 also includes a pair of tubes 204 and 205 that extend in opposite directions (180-degree spacing) from the bottom of the main cylinder of combustion chamber 201. Each of these tubes 204–205 extends away from the center axis of the main cylinder at an angle of 90 degrees for a distance of about 2 inches, and then turn upward at an angle of 90 degrees for a distance of about 2 inches, such that the ends of these tubes 204–205 extend upward in parallel with the center axis of the main cylinder. The inside diameter of each of tubes 204–205 is about 2 inches. The tips of each of tubes 204–205 narrow to an inside diameter of about 1 inch.

Although two tubes 204–205 are described in the present embodiment, it is understood that other number of tubes can be coupled to the bottom of the main cylinder in other embodiments. For example, three tubes having a 120-degree spacing, or four tubes having a 90-degree spacing can be implemented in other embodiments. However, such configurations may not be as easy to manufacture.

The tip of tube 204 is coupled to a coiled tube structure 206 that spirals around the main cylinder of combustion chamber 201. In the described embodiment, coiled tube structure 206 makes three turns around combustion chamber 201. Coiled tube structure 206 is formed by a plurality of 8 inch long sections of copper pipe and copper elbow joints, which are joined by silver solder. Each of these copper pipe sections and elbow joints has an inside diameter of 1 inch.

Similarly, the tip of tube 205 is coupled to a coiled tube structure 207 that spirals around the main cylinder of combustion chamber 201 and coiled tube structure 206. In the described embodiment, coiled tube structure 207 makes four turns around combustion chamber 201. Coiled tube structure 207 is formed by a plurality of 10 inch long sections of copper pipe and copper elbow joints, which are joined by silver solder. Each of these copper pipe sections and elbow joints has an inside diameter of 1 inch. In the described embodiment, both of coiled tube structures 206 and 207 turn around combustion chamber in the same direction, although this is not necessary. In other embodiments, coiled tube structures 206 and 207 can have other numbers of turns.

Figure 3:
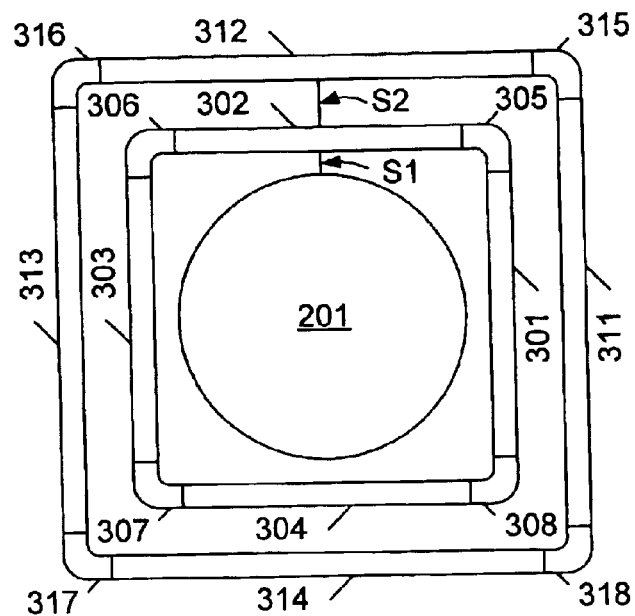
FIG. 3 is a top view of one turn of concentric coiled tube structures used in the energy system of FIG. 1.

FIG. 3 is a top view of the main cylinder of combustion chamber 201, one turn of coiled tube structure 206, which includes tube sections 301–304 and elbow joints 305–308, and one turn of coiled tube structure 207, which includes tube sections 311–314 and elbow joints 315–318. The spacing S1 between inner coiled tube structure 206 and combustion chamber 201 is about 1 inch, and the spacing S2 between outer coiled tube structure 207 and inner coiled tube structure 206 is about 1 inch. Although coiled tube structures 206 and 207 appear to form closed loops in FIG. 3, this is not the case. Thus, tube section 301 is not connected to elbow joint 308, but rather, to another elbow joint (now shown) located directly above elbow joint 308. Similarly, elbow joint 308 is coupled to another tube section (not shown) located directly below tube section 301. Similarly, tube section 311 is not connected to elbow joint 318, but rather, to another elbow joint (now shown) located directly above elbow joint 318. Elbow joint 318 is coupled to another tube section (not shown) located directly below tube section 311. This configuration of coiled tube structures 206 and 207 is achieved by angling the connections between the elbow joints and tube sections as illustrated in FIG. 2.

In other embodiments, coiled tube structures 206–207 can have other geometries. For example, these structures 206–207 may be formed in a circular coil shape, rather than the illustrated square coil shape. Moreover, although two coiled tube structures 206–207 have been described, it is understood that other numbers of coiled tube structures can be used in other embodiments. In general, the number of coiled tube structures will correspond with the number of tubes at the bottom of combustion chamber 201. Moreover, the pipes used to form coiled tube structures 206–207 can have an inside diameter other than 1 inch in other embodiments.

Figure 4:
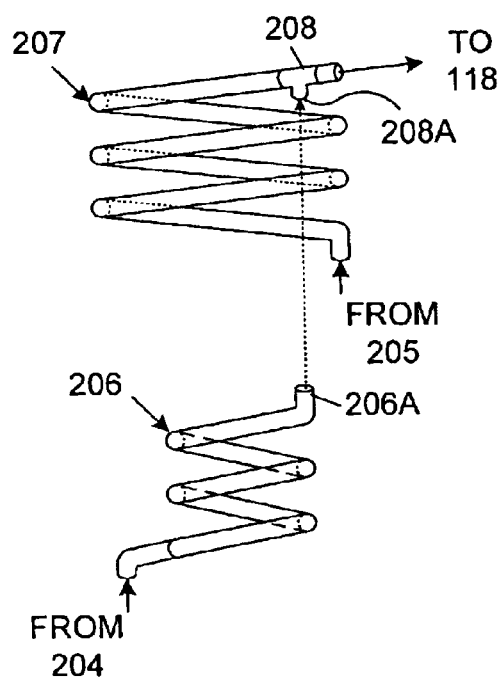
FIG. 4 is an exploded schematic diagram of a coiled tube structures used in the energy system of FIG. 1.

Coiled tube structures 206 and 207 are joined at their upper ends. FIG. 4 is an exploded side view of coiled tube structures 206 and 207, illustrating the manner in which these structures are joined at their upper ends by T-joint 208. Outer coiled tube structure 207 is attached to one opening of T-joint 208, and inner coiled tube structure 206 is attached to another opening of T-joint 208. The third opening of T-joint 208 is attached to steam line 118. In the described embodiment, steam line 118 is a copper pipe having a 2-inch inside diameter. Steam line 118 extends to radiator/blower 108, which is suspended on a stand, a wall or another supporting device.

Combustion chamber 201 and coiled tube structures 206–207 are suspended within inner container 220. Inner container 220 is filled with water 222. In one embodiment, struts (not shown) attached to combustion chamber 201 are supported on inner container 220, thereby suspending combustion chamber 201 and coiled tube structures 206–207 in water 222 within inner container 220. In the described embodiment, inner container 220 is a cylindrical 35-gallon stainless steel drum having an inside diameter of 19 inches. Inner container 220 is located within an outer container 240. In the described embodiment, outer container 240 is a cylindrical 50-gallon stainless steel drum having an inside diameter of 23 inches. Inner container 220 is thermally insulated from outer container 240 by a thermally insulating material 230 located in the gap between inner container 220 and outer container 240. In the described embodiment, thermally insulating material 230 is granulated Perlite. Outer container 240 is electrically grounded to prevent charge build-up on this container. Both inner and outer containers 220 and 240 are covered by lids 220A and 240A, respectively, which help to retain heat. In the described embodiment, lid 240A is located a distance "A" of about 6 inches above lid 220A. Lids 220A and 240A include openings necessary to allow the various elements of energy system 100 to enter and exit containers 220 and 240. Note that lids 220A and 240A do not provide for air-tight seals with their respective containers 220 and 240. In the described embodiment, lids 220A and 240A are stainless steel. Lids 220A and 240A can be provided with locking mechanisms to prevent access to the inside of vapor generator 101.

Vapor generator 101 operates as follows in accordance with one embodiment of the present invention. The upper opening in combustion chamber 201 is coupled to receive a low pressure air flow from blower 102. To receive this air flow, a 90° elbow joint 202 is fitted into the upper opening of combustion chamber 201. In the described embodiment, elbow joint 202 is made of stainless steel, and has an inside diameter of 2 inches. One end of elbow joint 202 is welded into the upper opening of combustion chamber 201 using a conventional welding process.

The other end of elbow joint 202 is connected to air supply line 112, which in turn, is coupled to air blower 102. In the described embodiment, air supply line 112 is flexible aluminum tubing having an inside diameter of 2 inches and a length of about 30 inches. When air blower 102 is turned on, air is forced through air supply line 112 and elbow joint 202 and into combustion chamber 201. In the described embodiment, air blower 102 is a 1 horsepower (hp) device available from Fuji Electric, as part number VFC400P. This air blower 102 is controlled to provide an air flow of about 70 cubic feet per minute (cfpm) at a maximum pressure of about 2 psi.

Combustion chamber 201 further includes a fuel inlet 213, which is coupled to fuel supply line 113. Fuel supply line 113 is not shown in FIG. 2 in order to provide clarity to this figure. However, fuel supply line 113 is routed through an opening in lid 240A. Fuel inlet 213 is located in the upper portion of the main cylinder of combustion chamber 201. In the described embodiment, fuel inlet 213 is located 2 inches from the top of combustion chamber 201, where combustion chamber 201 has an inside diameter of 3 inches. In the described embodiment, both fuel inlet 213 and fuel supply line 113 have an inside diameter of ¼ inch. Fuel inlet 213 is coupled to fuel supply line 113 by a metal sealed connector. Fuel supply 103 is controlled to provide a flow of fuel through fuel supply line 113 and fuel inlet 213 into combustion chamber 201. In the described embodiment, the fuel supply 103 is a 10-gallon fuel tank containing either propane or natural gas. Fuel supply 103 can be controlled manually or automatically in various embodiments of the present invention. The maximum fuel flow into combustion chamber 201 is on the order of 10 to 30 standard cubic feet per hour (scfh). In one embodiment, the fuel flow is about 0.8 gallons per hour, for a daily fuel cost of about $10. This is significantly less than conventional boiler systems. Fuel inlet 213 includes a control valve which limits the fuel pressure to about 1 psi.

Combustion chamber 201 also includes an opening for receiving spark plug 214. In the described embodiment, spark plug 214 is located at the same height as fuel inlet 213, with a 90 degree separation between spark plug 214 and fuel inlet 213. The spark plug 214 used in the described embodiment is available from Bosch as part number W6DC. Other spark plugs can be used in other embodiments. Spark plug 214 is coupled to ignition control line 114, which is not shown in FIG. 2 in order to provide clarity to this figure. However, ignition control line 114 is routed through an opening in 240A. Ignition controller 104 transmits electrical control signals to spark plug 214 on ignition control line 114. These electrical control signals are selected such that spark plug 214 fires (sparks) continuously while these electric control signals are being transmitted. The electrodes of spark plug 214 are located inside of combustion chamber 201, such that the sparks are created within combustion chamber 201. The expected life of spark plug 214 under these conditions is on the order of about 5000 hours. In the described embodiment, ignition controller 104 is a spark generator available from Dongan Electric Manufacturing Company as part number A06SAG.

Combustion chamber 201 also includes an opening that is coupled to a water inlet valve 215. The water inlet valve 215 is located below spark plug 214 and fuel inlet 213. In the described embodiment, water inlet valve 215 is located 8 inches from the top of the main cylinder of combustion chamber 201, where combustion chamber 201 has an inside diameter of 5 inches. The valve 215 used in the described embodiment is a ¼ inch unidirectional valve available from Whitey Valve, Inc. (WHI) as part number H31. Valve 215 is coupled to receive water from water supply 105 via water supply line 115. Water supply line 115 is not shown in FIG. 2 in order to provide clarity to this figure. However, water supply line 115 is routed through openings in lids 220A and 240A. In the described embodiment, water supply line 115 is a ¼ inch line. Water inlet valve 215 limits the flow of water into combustion chamber to 1 gallon per hour or less. Valve 215 causes water to enter combustion chamber 201 as a spray.

Within combustion chamber 201, the sparks introduced by spark plug 214 ignite the fuel introduced by fuel supply 103 and the air introduced by blower 102, thereby generating heat, which in turn, causes the water introduced by water supply 105 to turn to steam. Air blower 102 forces the burnt fuel/water mixture (hereinafter referred to as the "steam") toward the bottom of the main cylinder of combustion chamber 201. The steam pressure is increased near the bottom of the main cylinder of the combustion chamber 201 because the main cylinder narrows at this location.

Locating spark plug 214 and fuel inlet 213 near the top of the combustion chamber 201 advantageously allows for a long time for the fuel to burn. That is, the fuel is allowed to burn down the entire length of the main cylinder of combustion chamber 201. This allows the fuel to burn completely. The length of the main cylinder of combustion chamber 201 is selected to be long enough to allow the fuel to burn completely.

The force introduced by air blower 102 further causes the steam to flow through tubes 204 and 205, and into coiled tube structures 206 and 207, respectively. The steam flows through coiled tube structures 206 and 207 to T-joint 208 and into steam line 118. Steam line 118 routes the steam to radiator/blower 108.

In the described embodiment, radiator/blower 108 is a conventional device available from N.Y. Blower, Inc. as part number 104347 (size 102 VAC). Radiator/blower 108 includes a radiator system 108A, which includes a network of relatively small tubes, which are configured to receive the steam from steam line 118. Fins are mounted on these small tubes, such that heat from the steam is transferred to the small tubes and the fins, and ultimately, into the ambient air. Radiator system 108A includes a plurality of downward-facing vents, which direct the radiated heat downward. The network of small tubes is coupled to the exhaust port 119 at the top of radiator system 108A, thereby allowing the steam to leave radiator system 108A. In the described embodiment, exhaust port 119 has an inside diameter of 2 inches.

Radiator/blower 108 also includes a 120 VAC fan 108B, which can be turned on to introduce an air flow across the network of small tubes and fins in radiator system 108A, thereby improving heat transfer to the ambient air. Radiator/blower 108 is rated at 120 kilo-BTUs in the described embodiment.

Advantageously, the above-described system operates at a relatively low pressure, which does not exceed 3 psi, and is likely less than 2 psi. The pressure is limited to no more than 2 psi when air blower 102 provides an inlet pressure no greater than 2 psi through an air supply line 112 having a diameter of 2 inches, and the output steam is routed through a steam line 118 having a diameter of 2 inches. Because energy system 100 operates at a pressure below 14.7 psi, this system 100 does not need to meet the requirements of the Federal Boiler Code.

Returning now to vapor generator 101, the steam generated in combustion chamber 201 and forced through tubes 204–205 and coiled tube structures 206–207 causes these elements to be heated. This heat is transferred from combustion chamber 201 and coiled tube structures 206–207 to water 222. Tubes 204–205 and coiled tube structures 206–207 are designed to have a large surface area, which results in efficient heat transfer to water 222. Due to the insulation, the temperature of water 222 will vary less than 3° F. within container 220.

Hot water line 116 extends from water 222 to pump 106. In the described embodiment, all of the sections of hot water line 116 have an inside diameter of ¾ inch. Hot water line 116 includes hot water pipe 16a, which extends into water 222, between coiled tube structures 206 and 207, as illustrated in FIG. 2. Hot water pipe 16a extends a distance B of about 2 feet below lid 240A. The end of hot water pipe 16a extends below the bottom of combustion chamber 201 by about 6 inches. This configuration advantageously allows hot water pipe 16a to be heated by tubes 204–205, coiled tube structures 206–207 and combustion chamber 201. As a result, hot water traveling through pipe 16a is further heated on the way out of vapor generator 101.

In the described embodiment, hot water pipe 16a is joined to hot water pipe 16b by an elbow joint. Similarly, hot water pipe 16b is joined to hot water pipe 16c by another elbow joint. In the described embodiment, hot water pipes 16a–16c and the connecting elbow joints are all made of copper. Hot water pipe 16c is attached to flexible tubing 16d, which is made from stainless steel. Flexible tubing 16d facilitates the connection of hot water line 116 to the inlet of water pump 106.

Water pump 106 draws hot water 222 from inner container 220 through hot water line 116, and then forces this hot water into hot water line 117. In the described embodiment, water pump 106 is a conventional ½ horsepower pump available from Finish Thompson, Inc. (FTI) as part number AC4STS1U320B0015C008. Water pump 106 provides a flow of 240 gph through hot water lines 116–117. All of the sections of hot water line 117 have an inside diameter of ¾ inch. Flexible tubing 17a (which is made of stainless steel) facilitates a connection between the outlet of water pump 106 and hot water pipe 17b. Hot water pipe 17b is coupled to an elbow joint, which in turn, is coupled to radiator element 107. In the described embodiment, radiator element 107 is a 36-inch long, ¾ inch ID copper pipe having square 4½×4½ inch aluminum fins attached along the length. Such a radiator element 107 is commonly available from Hydro-Air Components, Inc. as part number ECH30. Radiator element 107, which is rated at about 1000 BTU, efficiently transfers the heat from the hot water pumped through the element to the fins, and thereby to the ambient air.

Radiator element 107 is connected to a U-joint 17c, which in turn, is connected to hot water pipe 17d. Hot water pipe 17d is connected to an elbow joint, which in turn, is connected to hot water return pipe 17e. Hot water return pipe 17e extends into inner container 220, such that hot water pumped through hot water line 117 is returned to inner container 220. In the described embodiment, hot water pipes 17b–17e and the associated joints are all made of copper. Advantageously, much of the heat not transferred to radiator element 107 is returned to the water 222 in inner container 220.

Hot water line 117 is supported at a desired level above the ground, such that the radiated heat provided by element 107 is provided at a desired location. For example, radiator element 107 may be positioned about 10 inches above the ground. In one embodiment, hot water line 117 is supported by a stand positioned under u-joint 17c.

Although only one hot water re-circulation system (including hot water lines 116–117, radiator element 107 and pump 106) is provided in the described embodiment, it is understood that one or more additional identical hot water re-circulation systems can be added to energy system 100 in other embodiments.

Moreover, in other embodiments, other radiators can be used in place of radiator element 107, or in addition to radiator element 107. For example, in another embodiment, radiator element 107 can be replaced with a radiator/blower similar to radiator/blower 108. Alternately, an additional radiator/blower similar to radiator/blower 108 can be connected along the same line as radiator element 107. Radiator element 107 (or its equivalent) should be sized extract an appropriate amount of heat from the hot water 222. That is, radiator element 107 should be sized to extract enough heat from hot water 222, such that the hot water 222 is prevented from boiling.

Furthermore, the design of coiled tube structures 206–207 must be considered in preventing hot water 222 from boiling. For example, increasing the diameter of the pipes used to form coiled tube structures 206–207 from 1 inch to 1¼ inches will reduce the heat transfer from coiled tube structures 206–207 to water 222. However, increasing the diameter of these pipes will allow the steam to flow more freely to radiator/blower 108, thereby increasing the temperature of the steam provided to radiator/blower 108 and exhaust 109. Thus, the coiled tube structures 206–207 should be designed to achieve the desired balance between heat transfer to water 222 and steam temperature.

Energy system 100 can be operated manually or with automatic control. To automatically control humidity, a humidity detector can be used to reduce the water flow to vapor generator 101 or turn off vapor generator 101 when the humidity of the ambient air exceeds a desired level. Alternately, automatic control can be used to route the exhaust steam along path 121 (if the humidity is below a desired level) or path 122 (if the humidity is above a desired level) in response to the detected humidity of the ambient air. In yet another embodiment, water supply 105 may be turned off to reduce the humidity. It is important to note that vapor generator 201 is able to operate with water supply 105 turned off. In this case, the exhaust of vapor generator 201 consists of a low moisture mixture of burnt fuel and air.

To automatically control the temperature of the ambient air, a thermostat can be used to turn off vapor generator 101 when the temperature of the ambient air exceeds a desired temperature. One such thermostat is available from Honeywell as part number UDC2300.

Energy system 100 has the following advantages. First, energy system provides heat (and optionally humidity) in an efficient manner. For the operating parameters described above (fuel flow=10 to 20 scfh; water flow<1 gallon per hour; air flow=70 cfm; and continuous ignition), the steam provided to radiator/blower 108 will have a temperature in the range of 130 to 300° F., and most likely about 150° F. The hot water provided to radiator element 107 will have a temperature in the range of 70 to 220° F., and most likely about 170° F. The calculated efficiency of energy system 100 is about 71 percent.

Energy system 100 advantageously operates relatively quietly. It is estimated that energy system 100 operates at a noise level of about 45 db.

Energy system 100 also exhibits a relatively short start up time. From room temperature, energy system is able to provide steam having a temperature of about 215° F. to radiator/blower 108 in about 2 minutes. At this time, the temperature of water 222 is about 80° F.

Energy system 100 is also efficient at retaining heat upon being turned off. For example, if energy system 100 is turned off when the hot water 222 has a temperature of 150° F., hot water 222 will remain at a temperature greater than 120° F. for at least 20 minutes. As a result, energy system 100 can begin generating steam and heat very quickly after being turned off for a relatively long time period.

Furthermore, the exhaust provided at exhaust port 119 is relatively clean. It is estimated that the exhaust will consist of about 40% CO, 30% $O_2$, 18% $CO_2$ and 4% NO (and 8% water vapor) if water is added to combustion chamber 201. If water is not added to combustion chamber, it is estimated that the exhaust will consist of about 70% CO, 18% $CO_2$, and 4% NO (and 8% water vapor). The amount of the exhaust is so small that it is not considered dangerous. In fact, some of the exhaust is considered beneficial in some cases (e.g., greenhouses).

In accordance with one embodiment, energy system 100 is started as follows. First, air blower 102 and ignition system 104 are turned on. As a result, any residual fuel in combustion chamber 201 will be safely burnt and blown out of exhaust port 119. About ten seconds later, fuel system 103 is turned on, thereby providing fuel flow to combustion chamber 201. At this time, fuel begins burning, thereby pre-heating combustion chamber 201. About ten seconds after fuel system 103 is turned on, water supply 105 is turned on, thereby introducing water to combustion chamber 201. Steam is then generated in combustion chamber 201 in the manner described above.

In accordance with another embodiment, energy system 100 is turned off by turning off fuel supply 103, ignition system 104 and water supply 105 at about the same time. Blower 102 is allowed to run for about 30 seconds longer, thereby clearing combustion chamber 201, tube structures 206–207 and steam line 118.

In one embodiment, a single energy system 100 may be used to provide heat (and optionally humidity) to an enclosure, such as a greenhouse. In another embodiment, a plurality of energy systems identical to energy system 100 may be located in a single enclosure. For example, a single greenhouse may house seven energy systems identical to energy system 100, with the exhaust ports of three of the energy systems being located inside the greenhouse to provide humidity to the ambient air, and the exhaust ports of four of the energy systems being routed outside of the greenhouse. The individual energy systems can be turned on and off independently in view of the requirements of the greenhouse.

In other embodiments, energy system 100 may be used to heat enclosures other than greenhouses. For example, energy system 100 can be used to heat residential, commercial or industrial buildings. In this case, the exhaust port 119 would almost certainly be routed outside of the enclosure, such that humidity would not be added to the building. In fact, almost all of the elements of energy system 100 would be located outside of the building in this example. However, radiator element 107 and radiator/blower 108 would likely be configured to route heat into the building. In one embodiment, radiator element 107 would be located under a conventional plenum, whereby a fan would introduce an air flow over radiator element 107, thereby blowing hot air into heating ducts of the building. Radiator/blower 108 may also be configured to blow hot air into the heating ducts of the building.

In yet other embodiments, energy system 100 can be modified to operate in other arrangements. For example, multiple vapor generators 201 can be used to supply a single radiator/blower 108.

The various embodiments of the structures and methods of this invention that are described above are illustrative only of the principles of this invention and are not intended to limit the scope of the invention to the particular embodiments described. Thus, the invention is limited only by the following claims.

What is claimed is:

1. A method of generating heat using a combustion chamber submerged in a container of water, the method comprising:
   blowing air into a first end of the combustion chamber at pressure less than 14.7 psi;
   introducing fuel and sparks into the combustion chamber, thereby generating vapor that is blown out of a second end of the combustion chamber at a pressure less than 14.7 psi;
   routing the vapor from the combustion chamber to a first radiator; and circulating water from the container, through a second radiator, back to the container.

2. The method of claim 1, further comprising routing the steam through coiled tube structures of the combustion chamber, wherein the coiled tube structures are submerged in the water.

3. The method of claim 2, further comprising extracting water from the container for circulation through a pipe that extends between the coiled tube structures.

4. The method of claim 1, further comprising blowing air from the first radiator to the second radiator.

5. The method of claim 1, further comprising thermally insulating the container.

6. The method of claim 1, further comprising introducing water into the combustion chamber, wherein the water is heated to create steam, which is included in the vapor.

7. The method of claim 6, further comprising exhausting the vapor from the first radiator into the ambient air.

8. The method of claim 6, wherein the method is started by:

initially blowing air into the combustion chamber and introducing sparks to the combustion chamber; and then introducing fuel to the combustion chamber; and then introducing water to the combustion chamber.

9. The method of claim 1, wherein the method is concluded by:

ceasing to introduce fuel, water and sparks to the combustion chamber, and then ceasing to blow air into the combustion chamber.

10. The method of claim 1, wherein the air is blown into the first end of the combustion chamber at pressure less than 3 psi, and vapor is blown out of the second end of the combustion chamber at a pressure less than 3 psi.

11. The method of claim 10, wherein the air is blown into the first end of the combustion chamber at pressure of about 2 psi, and vapor is blown out of the second end of the combustion chamber at a pressure of about 2 psi.

* * * * *